United States Patent
Kadel et al.

(10) Patent No.: US 10,581,750 B2
(45) Date of Patent: Mar. 3, 2020

(54) NETWORK ACCESS ENTITY FOR PROVIDING ACCESS TO A COMMUNICATION NETWORK

(71) Applicant: Deutsche Telekom AG, Bonn (DE)

(72) Inventors: Gerhard Kadel, Darmstadt (DE); Paul Arnold, Frankfurt am Main (DE)

(73) Assignee: DEUTSCHE TELEKOM AG, Bonn (DE)

(*) Notice: Subject to any disclaimer, the term of this patent is extended or adjusted under 35 U.S.C. 154(b) by 0 days.

(21) Appl. No.: 16/246,588

(22) Filed: Jan. 14, 2019

(65) Prior Publication Data
US 2019/0238474 A1   Aug. 1, 2019

(30) Foreign Application Priority Data
Jan. 26, 2018 (EP) .................................. 18153736

(51) Int. Cl.
| | |
|---|---|
| H04L 12/891 | (2013.01) |
| H04W 28/08 | (2009.01) |
| H04L 12/709 | (2013.01) |
| H04L 12/803 | (2013.01) |
| H04L 12/825 | (2013.01) |
| H04W 88/06 | (2009.01) |

(52) U.S. Cl.
CPC ............ H04L 47/41 (2013.01); H04L 45/245 (2013.01); H04L 47/125 (2013.01); H04L 47/25 (2013.01); H04W 28/085 (2013.01); *H04W 88/06* (2013.01)

(58) Field of Classification Search
CPC ....... H04L 47/41; H04L 47/25; H04L 47/125; H04L 45/245
See application file for complete search history.

(56) References Cited

U.S. PATENT DOCUMENTS

| 2013/0083661 A1* | 4/2013 | Gupta | H04W 4/70 370/235 |
|---|---|---|---|
| 2014/0071884 A1* | 3/2014 | Sherman | H04W 76/10 370/315 |
| 2014/0078906 A1* | 3/2014 | Chen | H04L 69/18 370/237 |

(Continued)

FOREIGN PATENT DOCUMENTS

WO    WO 2016195546 A1    12/2016

OTHER PUBLICATIONS

BT PLC: "Multi-access converged NG Core architecture", 3GPP Draft; S2-163455, 3rd Generation Partnership Project (3GPP), Mobile Competence Centre; vol. SA WG2, Jul. 10, 2016 (Jul. 10, 2016), XP051118053.

*Primary Examiner* — Curtis A Alia
(74) *Attorney, Agent, or Firm* — Leydig, Voit & Mayer, Ltd.

(57) ABSTRACT

A network access entity provides access to a communication network for a user equipment and a home gateway. The network access entity includes: a network interface configured to receive: a first status signal indicating a link quality of the first communication link; a second status signal indicating a link quality of the second communication link; and a third status signal indicating a link quality of the composite communication link; and a data flow manager for distributing data of a data stream towards the user equipment via the first communication link and via the second communication link.

15 Claims, 4 Drawing Sheets

(56) References Cited

U.S. PATENT DOCUMENTS

| | | | |
|---|---|---|---|
| 2015/0139184 A1* | 5/2015 | Wang | H04W 28/08 |
| | | | 370/331 |
| 2016/0088542 A1* | 3/2016 | Belghoul | H04W 28/0268 |
| | | | 370/331 |
| 2016/0119775 A1* | 4/2016 | Karaoguz | H04W 8/183 |
| | | | 455/434 |
| 2016/0174107 A1 | 6/2016 | Kanugovi et al. | |
| 2017/0078890 A1* | 3/2017 | Zhu | H04W 16/14 |

* cited by examiner

NETWORK ACCESS ENTITY FOR PROVIDING ACCESS TO A COMMUNICATION NETWORK

CROSS-REFERENCE TO RELATED APPLICATIONS

Priority is claimed to European Patent Application No. EP 18153736.6, filed on Jan. 26, 2018, the entire disclosure of which is hereby incorporated by reference herein.

FIELD

The invention relates to a network access entity for providing access to a communication network for a user equipment and a home gateway, a communication system comprising a home gateway, a user equipment and a network access entity, a method for providing access to a communication network for a user equipment and a computer program product.

BACKGROUND

FIG. 1 shows an arrangement according to the state of the art. A home communication network 100 comprises a home gateway 101 and a user equipment (UE) 102. The home gateway 101 provides a wireless local area network in the home communication network 100. The wireless local area network may be used by the user equipment 102 or other wireless local area network devices in the home communication network.

The home gateway 101 is connected to a network access entity 103 that provides access to a communication network 104. The communication network 104 may be the Internet. The home gateway 101 is connected to the network access entity 103 via a communication link 105. The communication link 105 may be a fixed line communication link or a wireless communication link, e.g. a cellular radio access network (RAN) or a fixed wireless access (FWA) network.

For connecting the user equipment 102 to the communication network 104, the user equipment 102 has to connect to the home gateway 101 and via the home gateway 101 to the network access entity 103 and to the communication network 104. The link quality the user equipment 102 obtains is therefore dependent on the communication link 105 and the wireless local area network connection. If the wireless local area network spanned by the home gateway 101 causes problems, the communication link quality decreases, and the user equipment 102 has a low link quality.

SUMMARY

In an exemplary embodiment, the present invention provides a network access entity for providing access to a communication network for a user equipment and a home gateway. The home gateway is connected to the network access entity via a first communication link. The user equipment is connected to the network access entity via a second communication link and is connected to the home gateway via a third communication link. The first communication link and the third communication link form a composite communication link. The network access entity includes: a network interface configured to receive: a first status signal indicating a link quality of the first communication link; a second status signal indicating a link quality of the second communication link; and a third status signal indicating a link quality of the composite communication link; and a data flow manager for distributing data of a data stream towards the user equipment via the first communication link and via the second communication link, wherein the data flow manager is configured to, if at least one of the first status signal or the second status signal indicates a higher link quality than a link quality that is indicated by the third status signal, determine a reduction of an amount of data of the data stream communicated over the first communication link and an increase of an amount of data of the data stream communicated over the second communication link.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
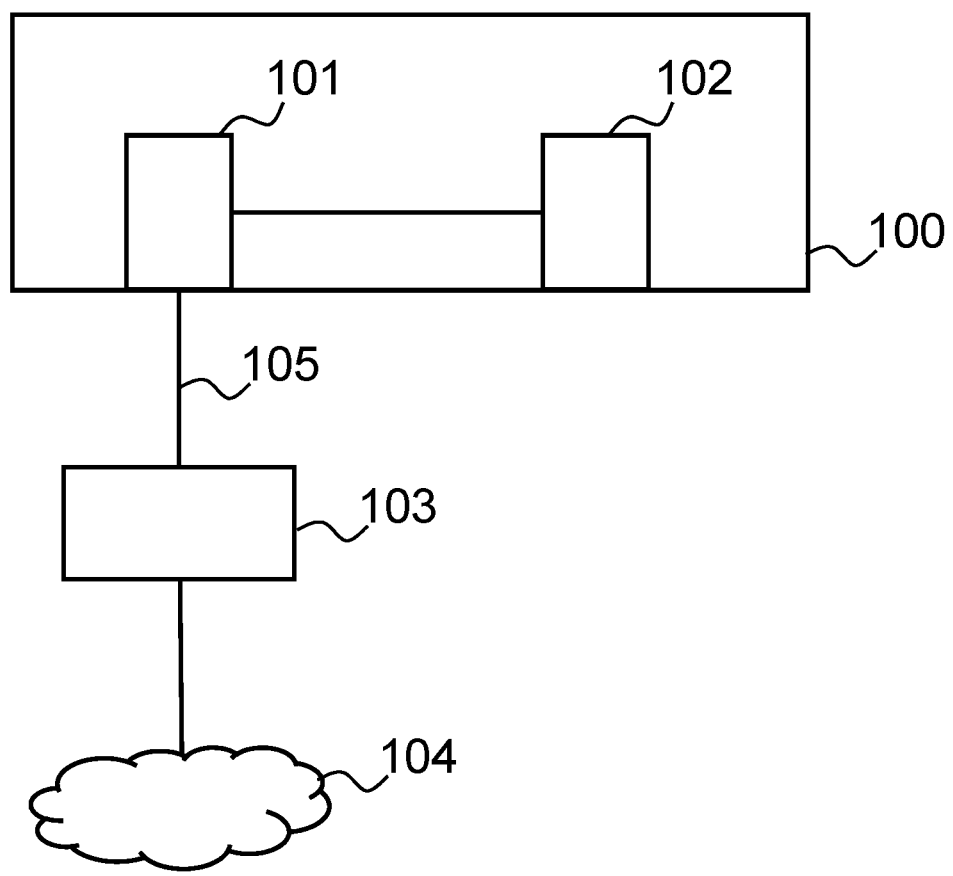
FIG. 1 shows a schematic diagram of an arrangement according to the state of the art.

Exemplary embodiments of the invention provide for distributing data and overcoming the problems described above.

According to a first aspect of the invention, a network access entity provides access to a communication network for a user equipment and a home gateway. The home gateway is connected to the network access entity via a first communication link. The user equipment is connected to the network access entity via a second communication link and is connected to the home gateway via a third communication link. The first communication link and the third communication link form a composite communication link. The network access entity comprises a network interface configured to receive a first status signal indicating a link quality of the first communication link, a second status signal indicating a link quality of the second communication link, and a third status signal indicating a link quality of the composite communication link. The network access entity comprises a data flow manager for distributing data of a data stream towards the user equipment via the first communication link and via the second communication link. The data flow manager is configured to determine a reduction of an amount of data of the data stream communicated over the first communication link and to determine an increase of an amount of data of the data stream communicated over the second communication link, if at least one of the first status signal or the second status signal indicates a higher link quality than a link quality that is indicated by the third status signal.

The user equipment may be a smartphone, a tablet computer or a notebook. The user equipment may be configured to communicate over the second communication link, for example a cellular radio access network (RAN), in particular Long-Term Evolution (LTE) or 5G, and the third communication link, for example a wireless local area network. The user equipment may be configured to communicate via the second communication link and the third communication link simultaneously, which could include an aggregation of the data rates of the two links.

The home network may be a network of a private house or a public network, for example of a restaurant, a library or a train station. The home gateway may function as a router for the home network or a fixed access gateway in a public home network. The first communication link may be a radio communication link, in particular a cellular RAN. The home gateway may be configured to provide the third communication link, in particular a wireless local area network link.

From the user equipment point of view, there are two possible communication links into the communication network. On the one hand, there is the second communication link that connects the user equipment directly to the network access entity of the communication network. On the other hand, the user equipment may communicate with the communication network via the composite communication link, i.e. via a combination of the third communication link and the first communication link.

The data flow manager in the network access entity may act as an access resource manager. The data flow manager may comprise a network interface. The network interface may be a logical network interface or a control plane interface. The data flow manager may further comprise a processor. The processor may be a virtual processor or a central processing unit (CPU) or a microcontroller within a computer system. For example, the data flow manager is allocated within a server of the network access entity and the processor comprises the CPU of the server.

The network interface of the data manager comprises one or more logical interfaces for connecting to one or more communication links. In particular, the network interface is a control plane interface. The network interface comprises a first interface to connect to the first communication link and a second interface to connect to the second communication link.

Different policies for the data flow management may be used. For example, the data flow manager controls the increase and/or the reduction of the amount of data of the data stream based on at least one of the following parameters: providing a constant data rate to the user equipment, providing a constant aggregated data rate to the user equipment, guaranteeing a minimum data rate for transmissions towards and from the user equipment, prioritization of the first network access entity or the second network access entity, prioritization of the network access entity comprising a fixed-line communication link before the network access entity comprising a RAN communication link.

The data flow manager may be configured to use different criteria for optimizing the data stream of the user equipment, for example, the data flow manager controls the data stream, i.e. the increase and/or the reduction of the amount of data of the data stream in a way that communication resources required for the transmission a minimized. Resources of the communication network, in particular the RAN, may be optimized by using the data flow manager, in particular the required resources may be reduced compared to a common network architecture without the data flow manager.

The temporal granularity of the control mechanisms the data flow manager may vary, in particular may be down to the millisecond or sub-millisecond range. The control mechanisms may comprise existing control protocols, for example multipath transmission control protocol (MPTCP), and/or LTE Wi-Fi Aggregation (LWA), and/or new control protocols.

The network links, i.e. the first communication link and the second communication link may be heterogeneous access network links with a varying link quality, in particular a link quality that is variable in a time and/or space dimension.

The communication network may be the Internet or a mobile communication network for telecommunications.

The network access entity may provide improved access with a constantly high data rate for a user equipment that is connected to the network access entity via a home gateway and a radio access network.

In an embodiment, the network access entity is a wireless access entity, in particular a base station, for providing radio access, or the network access entity is a fixed-line access entity, in particular a digital subscriber line access multiplexer (DSLAM).

The base station may be an eNodeB of a LTE network or a gNodeB of a 5G network. A wireless access entity provides access to a communication network for a mobile user equipment.

In an embodiment, the data flow manager is configured to distribute the data on the first communication link and the second communication link according to the determined increase of the amount of data and according to the determined reduction of the amount of data, respectively.

Distributing the data stream by the network access entity allows an overarching and dynamic control of the network connections by a single entity, the network access entity.

In an embodiment, the data flow manager is configured to reduce the data rate on the first communication link and to increase the data rate on the second communication link according to the determined increase of the amount of data or reduction of the amount of data on the respective communication link.

Decreasing the data rate on the first communication link relieves the first communication link. Increasing the data rate on the second communication link provides a constant data rate to the user equipment.

In an embodiment, the data flow manager is configured to determine the reduction of the amount of data and the increase of the amount of data upon a basis of a look-up table, the look-up table assigning reduction of amounts of data and increase of amounts of data to link qualities.

A look-up table provides fast assigning of values. Therefore, a resource of the network access entity may be preserved.

In an embodiment, the link quality is indicated by at least one of the following link quality parameters: bit error rate, packet error rate, communication delay, signal to noise ratio, possible data throughput, in particular possible instantaneous data throughput.

The above-named values are adequate parameters that can be measured easily and that can be processed by the network access entity.

According to a second aspect, a communication system comprises a home gateway, a user equipment and a network access entity. The network access entity is configured to provide access to a communication network for the user equipment and the home gateway. The home gateway is connected to the network access entity via a first communication link. The user equipment is connected to the network access entity via a second communication link and is connected to the home gateway via a third communication link. The first communication link and the third communication link form a composite communication link. The network access entity comprises a network interface configured to receive a first status signal indicating a link quality of the first communication link, a second status signal indicating a link quality of the second communication link, and a third status signal indicating a link quality of the composite communication link. The network access entity comprises a data flow manager for distributing data of a data stream towards the user equipment via the first communication link and via the second communication link. The data flow manager is configured to determine a reduction of an amount of data of the data stream communicated over the first communication link and to determine an increase of an amount of data of the data stream communicated over the second communication link, if at least one of the first status signal or the second status signal indicates a higher link quality than a link quality that is indicated by the third status signal.

According to a third aspect, the present invention includes a method for providing access to a communication network for a user equipment. A home gateway is connected to a network access entity via a first communication link. The user equipment is connected to the network access entity via a second communication link and is connected to the home gateway via a third communication link. The first communication link and the third communication link form a composite communication link. The method comprises: receiving a first status signal indicating a link quality of the first communication link; receiving a second status signal indicating a link quality of the second communication link; receiving a third status signal indicating a link quality of the composite communication link; comparing the link quality of the third status signal with the link quality of the first status signal and/or the second status signal; determining a reduction of an amount of data of the data stream communicated over the first communication link and an increase of an amount of data of the data stream communicated over the second communication link, if a result of the comparison indicates that at least link quality of the first communication link or the link quality of the second communication link is higher than the link quality of the composite communication link; and distributing data of a data stream towards the user equipment via the first communication link and via the second communication link according to the determined reduction and increase.

According to a fourth aspect, the present invention includes a computer program product with program code to execute the above described method, when the program code is being executed on a data flow manager.

Figure 2:
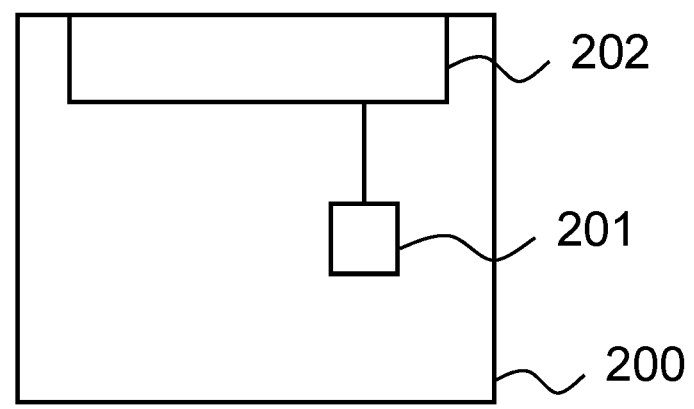
FIG. 2 shows a schematic diagram of a network access entity according to an embodiment of the invention.

FIG. 2 shows a network access entity 200. In the described embodiment, the network access entity 200 is a wireless network access entity, in particular a base station for a LTE or a 5G network. The described network access entity 200 provides radio access to a communication network. In another embodiment, the network access entity is a fixed line access entity, in particular a digital subscriber line access multiplexer (DSLAM).

The network access entity 200 comprises a network interface 202. The network interface 202 comprises a radio transceiver for receiving and transmitting radio signals. The network interface 202 comprises one or more logical interfaces for connecting to one or more communication links. In particular, the network interface 202 is a control plane interface. The network interface 202 comprises a first interface to connect to the first communication link 304 and a second interface to connect to the second communication link 305. In another embodiment, the network interface 202 further comprises a fixed line interface for receiving and transmitting communication signals via cable.

The network access entity 200 comprises a data flow manager 201. The data flow manager 201 is a logical entity within the network access entity 200 and may be implemented as a virtual computer system that is part of a server of the network access entity 200. In another embodiment, the data flow manager 201 is a CPU, a computer system, a microcontroller or a server that is part of the network access entity 200.

Figure 3:
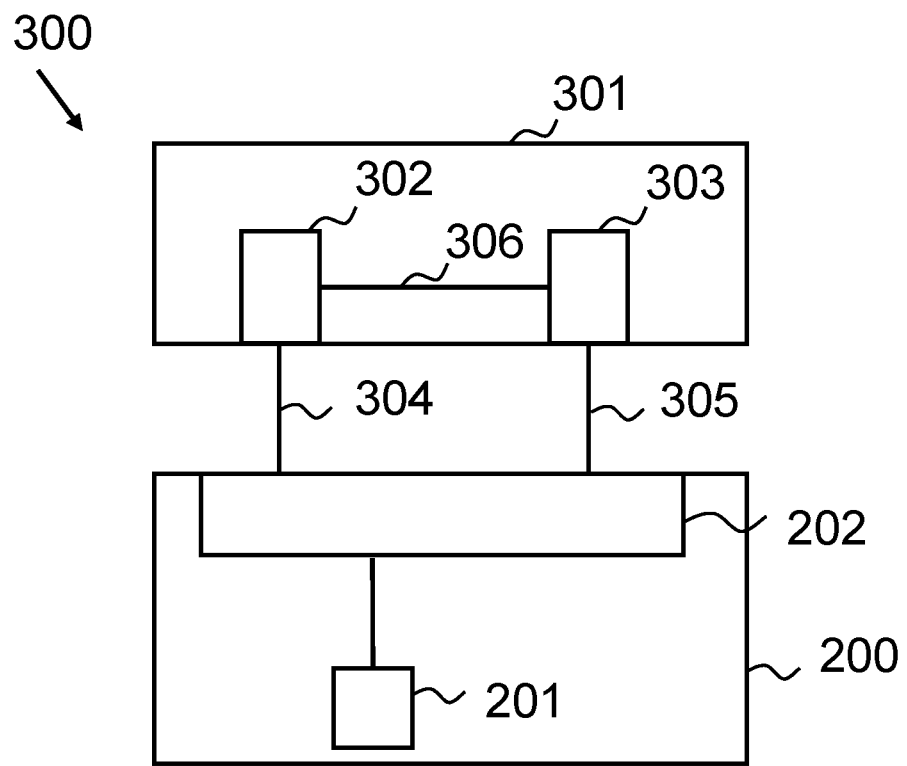
FIG. 3 shows a schematic diagram of an arrangement according to an embodiment of the invention.

FIG. 3 shows an arrangement with the network access entity 200 according to an embodiment of the invention. The arrangement 300 comprises a home network 301. The home network 301 comprises a home gateway 302. The home gateway 302 is a router for providing a network access to the communication network for private users or business users.

The home network 301 comprises a user equipment 303. The user equipment 303 is a mobile phone, used in the home network. In another embodiment, the user equipment 303 is another computer system, in particular a tablet computer, a desktop computer or a smart watch.

The arrangement 300 further shows the network access entity 200. The network access entity 200 can be a radio access network entity and provides access to a radio access network (RAN). For example, the network access entity 200 is an eNodeB for an LTE network or gNodeB for a 5G network.

The data flow manager 201 is functionally connected to the home gateway 302 and allocated in the network access entity 200. The home gateway 302 is connected to the network access entity 200 via a first communication link 304. The first communication link 304 can be a cellular RAN link or a Fixed Wireless Access (FWA) link. In another embodiment, the first communication link 304 is a fixed-line communication link, in particular for a digital subscriber line (DSL) network.

The network access entity 200 provides a radio access network. The user equipment 303 is configured to connect to the radio access network that is provided from the network access entity 200. The connection between the user equipment 303 to the network access entity 200 is a second communication link 305. The second communication link 305 is a radio access network communication link.

The home gateway 302 is configured to provide a third communication link 306, in particular a wireless local area network. In another embodiment, the third communication link 306 may comprise another kind of network link, such as a fixed-line local area network link, a radio access network link or others.

The user equipment 303 has access to the communication network via the second communication link 305 and the network access entity 200 or via the third communication link 306 and the first communication link 304, therefore, the third communication link 306 and the first communication link 304 forming a composite communication link. The composite communication link includes the home gateway 302.

The data flow manager 201 is configured to receive status signals. In particular, the network interface 202 of the network access entity 200 is configured to receive status signals and the data flow manager 201 is configured to process status signals.

The home gateway 302 is configured to transmit a first status signal indicating a link quality of the first communication link 304. The home gateway 302 transmits a status signal to the network access entity 200 and the data flow manager 201 of the network access entity 200 can determine the link quality of the first communication link 304 by evaluating the first status signal.

The user equipment 303 is configured to transmit a second status signal via the second communication link 305 towards the network access entity 200. The second status signal indicates a link quality of the second communication link 305. The user equipment 303 is also configured to transmit a third status signal towards network access entity 200, in particular towards the data flow manager 201, via the composite communication link. The third status signal therefore indicates the link quality of the composite communication link. The third status signal indicates the link quality of a combination of the first communication link 304 and the third communication link 306. The status signals are test signals that can be evaluated by the data flow manager 201 to determine a respective link quality.

The data flow manager 201 of the network access entity 200 is configured to compare the link quality of the first communication link 304, the link quality of the second communication link 305 and the link quality of the composite communication link by comparing the first status signal, the second status signal and/or the third status signal.

The data flow manager 201 is configured to determine a split of the data stream towards the user equipment 303. For splitting the data stream towards the user equipment 303, the results of the comparisons of the status signals indicating above-mentioned link qualities are used. In a preset, the data stream is transmitted via the first communication link 304 towards the home gateway 302 and therefore via the composite communication link towards the user equipment 303.

The result of the comparison of the third status signal and the first status signal indicates the link quality of the third communication link 306.

The amount of data transmitted over the second communication link 305 is increased, if the comparison of the first status signal and the third status signal indicates that the link quality of the third communication link 306 is lower than the link quality of the first communication link 304.

Furthermore, the amount of data transmitted via the second communication link 305 is also increased, if the second status signal indicates a higher link quality than the link quality indicated by the third status signal.

Figure 4:
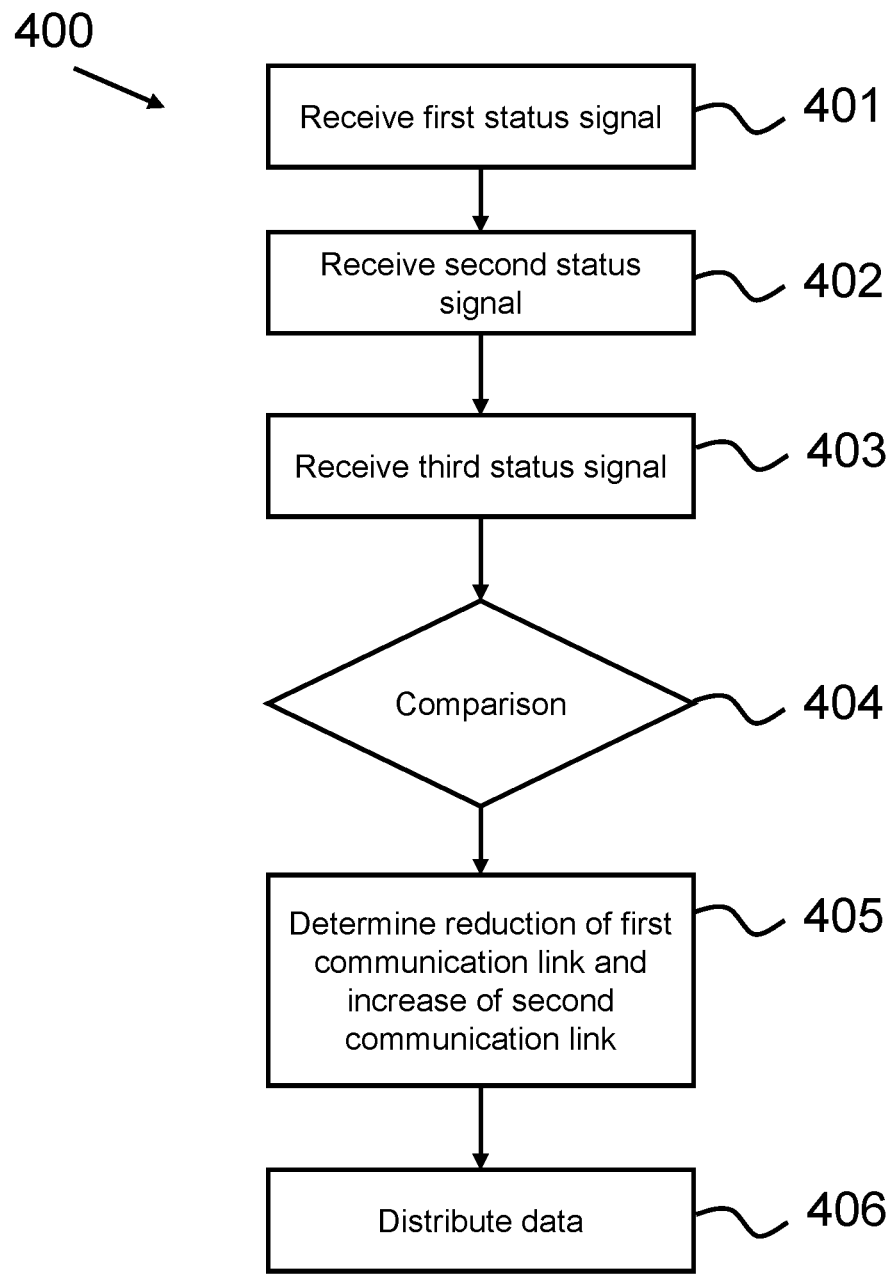
FIG. 4 shows a schematic flowchart diagram of a method according to an embodiment of the invention.

FIG. 4 shows a schematic flowchart diagram of a method according to an embodiment of the invention. In step 401, the network access entity 200 receives a first status signal. The first status signal is received by the network interface 202 and forwarded to the data flow manager 201.

The received first status signal was transmitted by the home gateway 302 of the home network 301 towards the communication network and is received by the network interface 202 of the network access entity 200. The first status signal indicates the quality of the first communication link 304.

In step 402, a second status signal is received by the network interface 202 of the network access entity 200. The second status signal indicates the link quality of the second communication link 305 and was transmitted by the user equipment 303.

In step 403, the network interface 202 of the network access entity 200 receives a third status signal that indicates the link quality of the composite communication link, i.e. the link quality of the combination of the first communication link 304 and the third communication link 306. In another embodiment, the order of the steps 401, 402 and 403 is different, so that the status signals are received in a different order.

The received first status signal, the received second status signal and the received third status signal are processed by the data flow manager 201 in step 404. In particular, the data flow manager 201 compares the link qualities of the first communication link 304, the second communication link 305 and the composite communication link by validating the three different status signals. A comparison of the first status signal and the third status signal results in a value that indicates the link quality of the third communication link 206.

In step 405, the data flow manager 201 determines a distribution of the data stream towards the user equipment 303 based on the link quality of the first communication link 304 and the second communication link 305 and the link quality of the third communication link 306.

If the comparison of step 404 indicates that the link quality indicated by the first communication link 304 is better than the link quality of the third communication link 306 and/or the quality of the second communication link 305 is better than the quality of the third communication link 306, the data flow manager 201 determines in step 405 the distribution of the data stream towards the user equipment 303 by increasing the amount of data streamed over the second communication link 305 and decreasing the amount of data of the data stream communicated over the first communication link 304, therefore reducing the data stream communicated over the third communication link 306.

The data flow manager 201 provides a control signal in step 406 that instructs network access entity 200 to provide a respective data distribution according to the determined communication link distribution of step 405.

In another embodiment, the data flow manager 201 of the network access entity 200 does not receive the second status signal of step 402 and/or determines the distribution only based on a comparison of the first status signal with the third status signal. In this case, the data flow manager 201 increases the amount of data of the data stream communicated over the second communication link 305 if the first status signal indicates that the first communication link 304 has a higher link quality than the third communication link 306 independently of the quality of the second communication link 305.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A network access entity for providing access to a communication network for a user equipment and a home gateway, the home gateway being connected to the network access entity via a first communication link, the user equipment being connected to the network access entity via a second communication link and being connected to the home gateway via a third communication link, the first communication link and the third communication link forming a composite communication link, the network access entity comprising:
a network interface configured to receive:
a first status signal indicating a link quality of the first communication link;
a second status signal indicating a link quality of the second communication link; and
a third status signal indicating a link quality of the composite communication link; and
a processor configured to distribute data of a data stream towards the user equipment via the first communication link and via the second communication link;
wherein the processor is further configured to, based on at least one of the first status signal or the second status signal indicating a higher link quality than a link quality that is indicated by the third status signal, determine a reduction of an amount of data of the data stream communicated over the first communication link and an increase of an amount of data of the data stream communicated over the second communication link.

2. The network access entity according to claim 1, wherein the network access entity is a base station or a digital subscriber line access multiplexer.

3. The network access entity according to claim 1, wherein the processor is configured to distribute the data on the first communication link and the second communication link according to the determined increase and reduction, respectively.

4. The network access entity according to claim 1, wherein the processor is configured to reduce the data rate on the first communication link and to increase the data rate on the second communication link according to the determined increase and reduction.

5. The network access entity according to claim 1, wherein the processor is configured to determine the reduction and the increase based on a look-up table, the look-up table assigning reductions and increases to link qualities.

6. The network access entity according to claim 1, wherein the link quality is indicated by at least one of the following link quality parameters: bit error rate, packet error rate, communication delay, signal to noise ratio, and/or possible instantaneous data throughput.

7. A communication system, comprising:
a home gateway;
a user equipment; and
a network access entity configured to provide access to a communication network for the user equipment and the home gateway, the home gateway being connected to the network access entity via a first communication link, the user equipment being connected to the network access entity via a second communication link and being connected to the home gateway via a third communication link, the first communication link and the third communication link forming a composite communication link, the network access entity comprising:
a network interface configured to receive a first status signal indicating a link quality of the first communication link, a second status signal indicating a link quality of the second communication link, and a third status signal indicating a link quality of the composite communication link; and
a processor configured to distribute data of a data stream towards the user equipment via the first communication link and via the second communication link, wherein the processor is further configured to, based on at least one of the first status signal or the second status signal indicating a higher link quality than a link quality that is indicated by the third status signal, determine a reduction of an amount of data of the data stream communicated over the first communication link and an increase of an amount of data of the data stream communicated over the second communication link.

8. The communication system according to claim 7, wherein the network access entity is a base station or a digital subscriber line access multiplexer.

9. The communication system according to claim 7, wherein the processor is configured to distribute the data on the first communication link and the second communication link according to the determined increase and reduction, respectively.

10. The communication system according to claim 7, wherein the processor is configured to reduce the data rate on the first communication link and to increase the data rate on the second communication link according to the determined increase and reduction.

11. The communication system according to claim 7, wherein the processor is configured to determine the reduction and the increase based on a look-up table, the look-up table assigning reductions and increases to link qualities.

12. The communication system according to claim 7, wherein the link quality is indicated by at least one of the following link quality parameters: bit error rate, packet error rate, communication delay, signal to noise ratio, and/or communication bandwidth.

13. A method for providing access to a communication network for a user equipment, wherein a home gateway is connected to a network access entity via a first communication link, the user equipment is connected to the network access entity via a second communication link and is connected to the home gateway via a third communication link, the first communication link and the third communication link forming a composite communication link, the method comprising:
receiving a first status signal indicating a link quality of the first communication link;
receiving a second status signal indicating a link quality of the second communication link;
receiving a third status signal indicating a link quality of the composite communication link;
comparing the link quality of the third status signal with the link quality of the first status signal and/or the second status signal;
based on the comparison indicating that the link quality of the first communication link and/or the link quality of the second communication link is higher than the link quality of the composite communication link, determining a reduction of an amount of data of the data stream communicated over the first communication link and an increase of an amount of data of the data stream communicated over the second communication link; and distributing data of a data stream towards the user equipment via the first communication link and via the second communication link according to the determined reduction and increase.

14. The method of claim 13, wherein determining the reduction and the increase is based on a look-up table, the look-up table assigning reductions and increases to link qualities.

15. A non-transitory computer-readable medium having processor-executable instructions stored thereon for providing access to a communication network for a user equipment, wherein a home gateway is connected to a network access entity via a first communication link, the user equipment is connected to the network access entity via a second communication link and is connected to the home gateway via a third communication link, the first communication link and the third communication link forming a composite communication link, wherein the processor-executable instructions, when executed by a processor, facilitate:

receiving a first status signal indicating a link quality of the first communication link;

receiving a second status signal indicating a link quality of the second communication link;

receiving a third status signal indicating a link quality of the composite communication link;

comparing the link quality of the third status signal with the link quality of the first status signal and/or the second status signal;

based on the comparison indicating that the link quality of the first communication link and/or the link quality of the second communication link is higher than the link quality of the composite communication link, determining a reduction of an amount of data of the data stream communicated over the first communication link and an increase of an amount of data of the data stream communicated over the second communication link; and distributing data of a data stream towards the user equipment via the first communication link and via the second communication link according to the determined reduction and increase.

* * * * *